United States Patent
Zemyan (10) Patent No.: US 6,279,689 B1
(45) Date of Patent: Aug. 28, 2001

(54) HYDRAULIC PARKING BRAKE FOR A RAILROAD VEHICLE BRAKING SYSTEM

(75) Inventor: James Zemyan, Wilmerding, PA (US)

(73) Assignee: Westinghouse Air Brake Company, Wilmerding, PA (US)

( * ) Notice: Subject to any disclaimer, the term of this patent is extended or adjusted under 35 U.S.C. 154(b) by 0 days.

(21) Appl. No.: 09/233,896

(22) Filed: Jan. 20, 1999

(51) Int. Cl.[7] .................................................. B61H 13/00
(52) U.S. Cl. ........................... 188/33; 188/52; 188/153 R
(58) Field of Search .................................. 188/33, 52, 53, 188/54, 55, 202, 203, 198, 199, 153 R, 153 D (56) References Cited

U.S. PATENT DOCUMENTS

| | | | |
|---|---|---|---|
| 4,175,793 | * 11/1979 | Clemmons | 188/153 R |
| 4,201,277 | * 5/1980 | Meier et al. | 188/153 R |
| 4,662,485 | * 5/1987 | Kanjo et al. | 188/202 |
| 5,069,312 | * 12/1991 | Kanjo et al. | 188/33 |
| 5,701,975 | * 12/1997 | Hawryszkow | 188/52 |
| 5,713,261 | * 2/1998 | Ring et al. | 188/202 |
| 5,794,739 | * 8/1998 | Ring et al. | 188/153 R |

* cited by examiner

Primary Examiner—Christopher P. Schwartz
Assistant Examiner—Robert A. Siconolfi
(74) Attorney, Agent, or Firm—James Ray & Associates (57) ABSTRACT

A hydraulic parking brake assembly for a railroad vehicle braking system is provided for an automatic application of the parking brake in the absence of an air source. The hydraulic parking brake assembly comprises a hydraulic actuator having a hydraulic piston and a spindle. The spindle is capable of entering a hole provided in the back surface of a pneumatic cylinder of the railroad vehicle braking system. Upon the application of hydraulic fluid within the hydraulic actuator, the hydraulic piston and spindle move in a forwardly direction, causing the spindle to contact the piston within the pneumatic cylinder and apply a force to this pneumatic piston as if pneumatic pressure were applied within the pneumatic cylinder. Such application of force to the pneumatic piston initiates a braking sequence to achieve application of the parking brake to the railroad vehicle eliminating the need to manually apply the parking brake with a hand wheel.

23 Claims, 8 Drawing Sheets

HYDRAULIC PARKING BRAKE FOR A RAILROAD VEHICLE BRAKING SYSTEM

FIELD OF THE INVENTION

The present invention relates, in general, to a parking brake arrangement for a railroad vehicle type braking system and, more particularly, this invention relates to an automatic hydraulic type parking brake for a railroad vehicle braking system and, still more specifically, to an automatic hydraulic type parking brake for use on truck mounted brake assemblies.

BACKGROUND OF THE INVENTION

As is generally well known in the railway industry, when railway cars are taken out of a train and parked at a siding or yard, the hand brake or parking brake on at least some of these cars must be applied as a precaution against unwanted and/or unexpected movement of the cars. A typical railway car hand brake system normally consists of an apparatus for manually applying and biasing one or more brake shoes against the tread of one or more wheels of the railway car by either turning a hand wheel or pumping a ratchet handle on a hand brake mechanism attached to the railway car.

Figure 2:
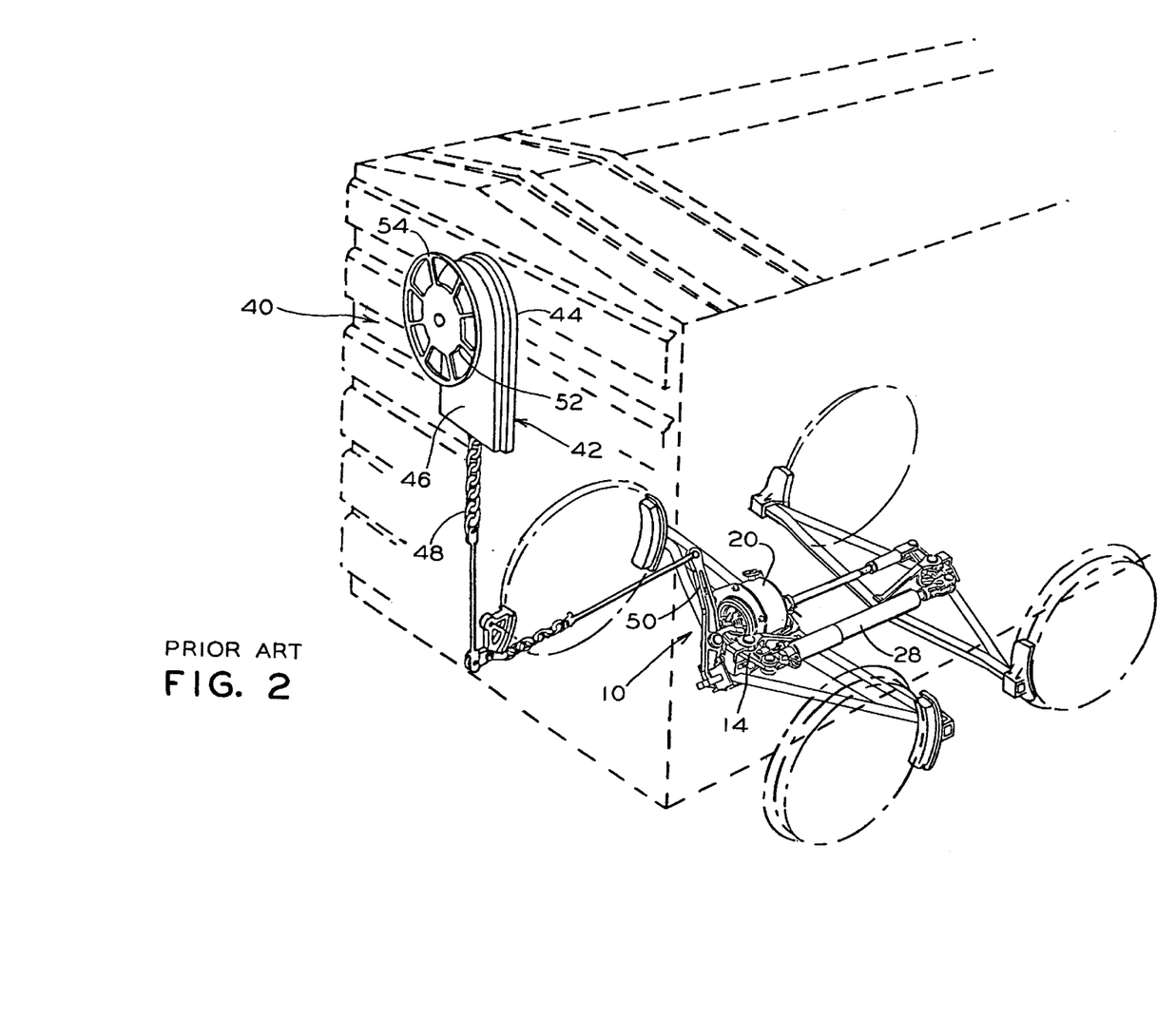
FIG. 2 is a plan view of a truck-mounted brake assembly having a conventional prior art handwheel hand brake or parking brake, as described above, and is accordingly labeled "Prior Art".

As illustrated in FIG. 2, in truck mounted braking systems, the hand brake mechanism is usually either a cast or stamped metal gear housing usually attached to an outside end wall of the railway car and having a rotatable chain drum therein which can be rotated by turning the hand wheel to wind a brake chain onto the chain drum. The other end of the brake chain normally extends through the bottom of the gear housing and is interconnected with a cable or other linkage, such as a hand brake lever, to the brake beam which carries the brake shoes such that winding of the brake chain onto the chain drum will apply tension to the brake chain and linkage as will be necessary to draw the interconnected brake shoes against the respective tread surfaces of adjacently disposed railway car wheels and, accordingly, apply the hand brake as intended.

A disadvantage of this prior art type hand brake parking brake arrangement is that operation of the handwheel requires exerting a considerable amount of physical force. Oftentimes this physical force must be exerted from an awkward position. This, in turn, makes the hand brake or parking brake rather difficult to apply and could present a possible serious injury hazard. Still another significant disadvantage of this type of hand brake parking brake arrangement is that it requires an operator to manually apply the hand brake to each individual car, requiring a significant amount of time and labor.

SUMMARY OF THE INVENTION

An object of the present invention is to provide an automatic hydraulic parking brake for a railway vehicle braking system which is an ergonomic alternative to the currently used manually activated hand brake assemblies.

Another object of the present invention is to provide an automatic hydraulic parking brake for a railway vehicle braking system which is particularly applicable to TMX® truck mounted type braking systems. (TMX® is a registered trademark to Westinghouse Airbrake Company, the assignee of the present invention).

Still another object of the present invention is to provide an automatic hydraulic parking brake for a railway vehicle braking system which may be used to replace the currently used manually activated handwheel type hand brakes.

A further object of the present invention is to provide a hydraulic parking brake which may be quickly and easily applied thus providing a reduced chance of injury to the operator applying this brake.

Yet another object of the present invention is to provide a hydraulic parking brake which may be quickly and easily applied thus providing a significant reduction in time and labor.

Briefly, and in accordance with the foregoing objects, the instant invention comprises a hydraulic actuator engaged with a railroad vehicle braking system. This hydraulic actuator will typically be mounted at the rear of the air brake cylinder. The hydraulic actuator includes a hydraulic piston member and a spindle having a first end which is attached to the hydraulic piston member. Both the hydraulic piston member and the spindle are capable of movement in a forwardly and a rearwardly direction upon application of hydraulic pressure thereto. The second end of the spindle enters into an aperture which is provided in the rear of the air cylinder and is capable of contacting the piston of the air cylinder upon activation of and forward movement of the hydraulic piston member.

Movement of the hydraulic piston member and spindle in both a forward direction and a rearward direction is achieved by the application of a hydraulic fluid, such as water or oil, within selected openings in the hydraulic actuator. Forward movement of the hydraulic piston member and the spindle will cause the second end of the spindle to contact and apply a force to the air cylinder piston. This force applied to the air cylinder piston will then cause movement of the air cylinder piston which, in turn, applies a force to the push rod within the air brake cylinder causing movement of the push rod in a forward direction. This forward movement of the push rod applies a force to the force transfer lever which causes the force transfer lever to rotate in a counterclockwise direction to apply a force to the slack adjuster assembly in order to effect activation of the parking brake assembly.

Although a number of objects and advantages of the present invention have been described in some detail above, various additional objects and advantages of the hydraulic parking brake lever arrangement of the present invention will become more readily apparent to those persons who are skilled in the art from the following more detailed description of the invention, particularly, when such detailed description of the invention is taken in conjunction with both the attached drawing figures and with the appended claims.

DETAILED DESCRIPTION OF THE INVENTION

Prior to proceeding with the more detailed description of the invention, a description of a truck mounted braking system and its functioning should prove helpful in understanding the present invention. Also, it should be noted that for the sake of clarity, identical components which have identical functions have been identified with identical reference numerals throughout the several views illustrated in the attached drawing figures.

Figure 1:
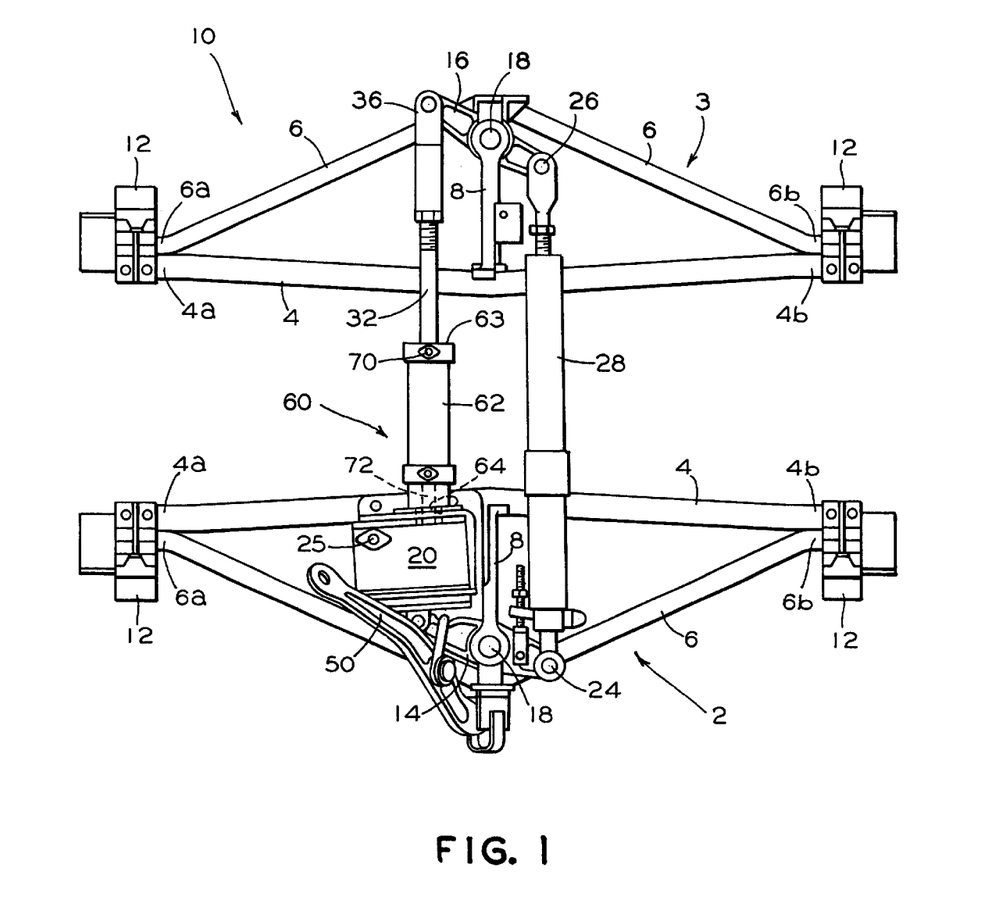
FIG. 1 is a plan view of a railway vehicle truck-mounted brake assembly including the hydraulic parking brake of the present invention.

Referring now to FIG. 1, there is shown a presently preferred embodiment of a truck-mounted brake assembly, generally designated 10, for a railway car (not shown) including a conventional type hand brake lever 50. This brake assembly 10 comprises brake beams, generally designated 2 and 3, which are substantially identical. Each of the brake beams 2 and 3 includes a compression member 4, a tension member 6 and a strut member 8. The opposite ends of the compression member 4 and the tension member 6 may be permanently connected together, preferably by welding along an outer segment 4a–6a, 4b–6b at the opposite ends of the compression member 4 and the tension member 6.

At a location substantially midway between their opposite ends, the compression member 4 and the tension member 6 of the, respective, brake beams 2 and 3 are spaced apart sufficiently to allow connection of the strut member 8 therebetween. Mounted on the respective outer end segments 4a–6a and 4b–6b of the brake beams 2 and 3 are brake heads 12.

A pair of force-transfer levers 14 and 16 are pivotally connected by pins 18 to the strut member 8 of the respective brake beams 2 and 3. Each end 24 and 26 of the respective force-transfer levers 14 and 16 is interconnected via the force-transmitting member 28, which may be in the form of an automatic slack adjuster device. The opposite end 36 of the force-transfer lever 16 is connected to the pressure head of the brake cylinder assembly 20 via a force-transmitting member or a return push rod assembly 32. A brake cylinder flange type air inlet 25 is provided on the brake cylinder assembly 20.

Figure 1A:
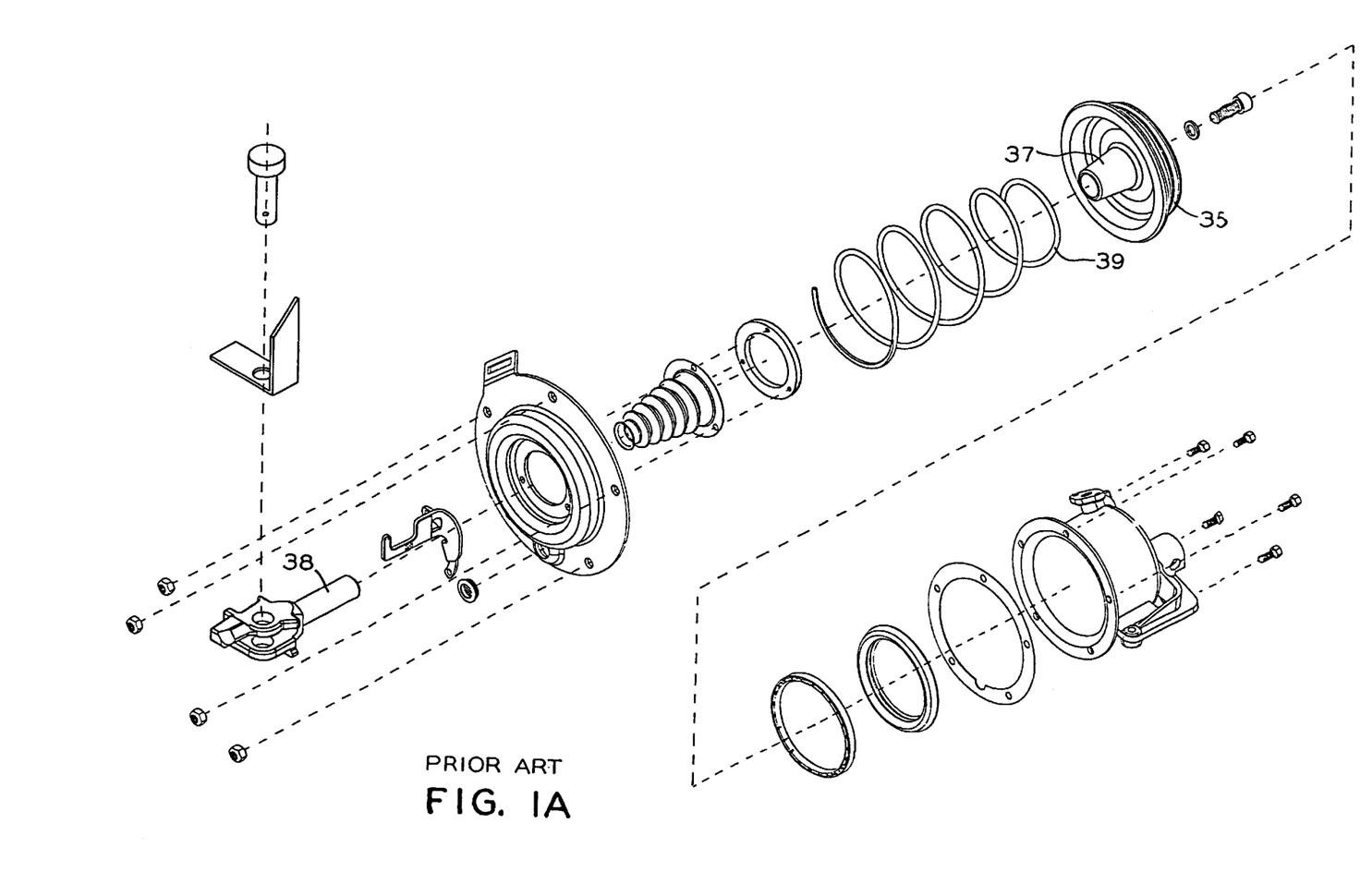
FIG. 1A is an expanded view of the prior art type brake cylinder, illustrated in FIG. 1, which is currently in use in such railway vehicle truck mounted brake assemblies.

Referring to FIG. 1A of an expanded view of the air brake cylinder of FIG. 1, an air cylinder piston 35 is provided which moves in a forwardly direction upon the application of pneumatic pressure thereto. A piston rod 37 is attached at a first end thereof to the piston 35 and moves in accordance with the movement of the piston 35. A second end of the piston rod 37 is connected to the end of a push rod 38 which is, in turn, connected to the force transfer lever 14.

The brake cylinder assembly 20 is connected to both the strut member 8, adjacent one side thereof, and the compression member 4 in the space located between the compression member 4 and the tension member 5. In this arrangement, the weight of the brake cylinder assembly and the force-transmitting members is carried by the brake beams 2 and 3, which are, in turn, supported by the truck side frames (not shown).

When a brake application is made, pressurization of the brake cylinder assembly 20 will result in actuation of the air brake cylinder piston 35 located in the brake cylinder assembly 20. This actuation of the piston 35 causes movement of the piston rod 37 in a forward direction which causes a return spring 39, also located in the brake cylinder assembly 20, to compress. Actuation of the brake cylinder, in this manner, will result in movement of a push rod 38 in a direction to effect a counterclockwise rotation of the force-transfer lever 14. The force-transfer lever 14, in turn, actuates the slack adjuster assembly 28 to effect counterclockwise rotation of the force-transfer lever 16 and consequent actuation of the return push rod assembly 32.

The force-transfer levers 14 and 16, along with the slack adjuster assembly 28, the return push rod assembly 32 and the brake cylinder assembly 20 comprise a brake beam actuating linkage that interconnects the, respective, brake beams 2 and 3 via the pivot pins 18 and thus the required brake actuation forces effectively act along these pivot pins 18. The resultant of these forces is shown at X. Because the slack adjuster assembly 28 acts as a rigid member during a brake application, it is important that the length of the slack adjuster assembly 28 be allowed to increase with brake shoe wear and/or loss of a brake shoe during service so that movement of the brake cylinder piston 35 and piston rod 37 will enable such brake beams 2 and 3 to be moved apart by the brake beams linkage until brake shoe engagement with the tread surface of the vehicle wheels occurs.

During a parking situation when the railway cars are taken out of the train and parked at a siding or yard, the pneumatic braking system, as described above, can no longer be used. Thus, in order to apply the brake as a precaution against unwanted or unexpected movement of the cars, a hand brake mechanism, which is mounted on each car, can be employed.

Referring to FIG. 2, a currently used hand brake mechanism, generally designated 40, disposed on a truck-mounted brake assembly is shown. The hand brake mechanism 40 includes a housing, generally designated 42, which includes a back plate or wall portion 44 mountable on a railway car and a cover member 46. The cover member 46 is secured to the back wall portion 44.

A chain 48, for both application and release of the brakes, is connected, as is conventional practice in the railroad industry, to the brake rigging 10 via a hand brake lever 50. Such chain 48 is both attached to and wound on to a winding drum 52. The hand brake lever 50 is, in turn, connected to an air cylinder transfer lever or force transfer lever 14.

In order to apply the brakes, a hand wheel 54 is rotated in a clockwise direction to wind the chain 48 about the winding drum 52 and to cause the hand brake lever 50 to be pulled in an outwardly direction away from the brake rigging 10. This causes the force transfer lever 14 to be rotated in a counterclockwise direction resulting in the piston push rod 38 being pulled in an outwardly direction and the required force being applied to the slack adjuster assembly 28. This force acts in a manner that is similar to the force which is applied by the brake cylinder piston and piston rod of the air cylinder assembly 20 when such is pressurized.

The present invention would replace this manually actuated hand wheel/chain/hand brake lever system with an automatic hydraulic parking brake, generally designated 60, as illustrated in FIG. 1. The automatic hydraulic parking brake 60 comprises a hydraulic actuator 62 which is engaged with the vehicle braking system, preferably, installed at the rear of air brake cylinder 20, replacing some of the existing components of the return push rod assembly 32.

In many applications, it would be expected that the parking brake mechanism would be required to travel within existing apertures formed through the truck bolster. As such, this design calls for a hydraulic mechanism or hydraulic actuator 62 with a diameter housing not to exceed the diameter of an existing slack adjuster 28, which is approximately three inches or whatever the maximum bolster clearances allow. The return push rod 32, used in the presently preferred embodiment of the hydraulic parking brake system of the present invention, is shorter than the return push rod of currently used truck mounted braking systems. This will enable the hydraulic actuator 62 to be mounted between the force transfer lever 16 and the air cylinder 20. If necessary, a solid wall portion 63 can be provided at the end of the hydraulic actuator 62 in order to accept a shorter, modified return push rod assembly 32.

In the presently preferred embodiment, the hydraulic parking brake will be affixed to the rear of the air brake cylinder 20. The rear of the air brake cylinder 20 would be manufactured with a hole 64 which allows a portion of the spindle 72 of the hydraulic parking brake mechanism 60 to pass.

Figure 3A:
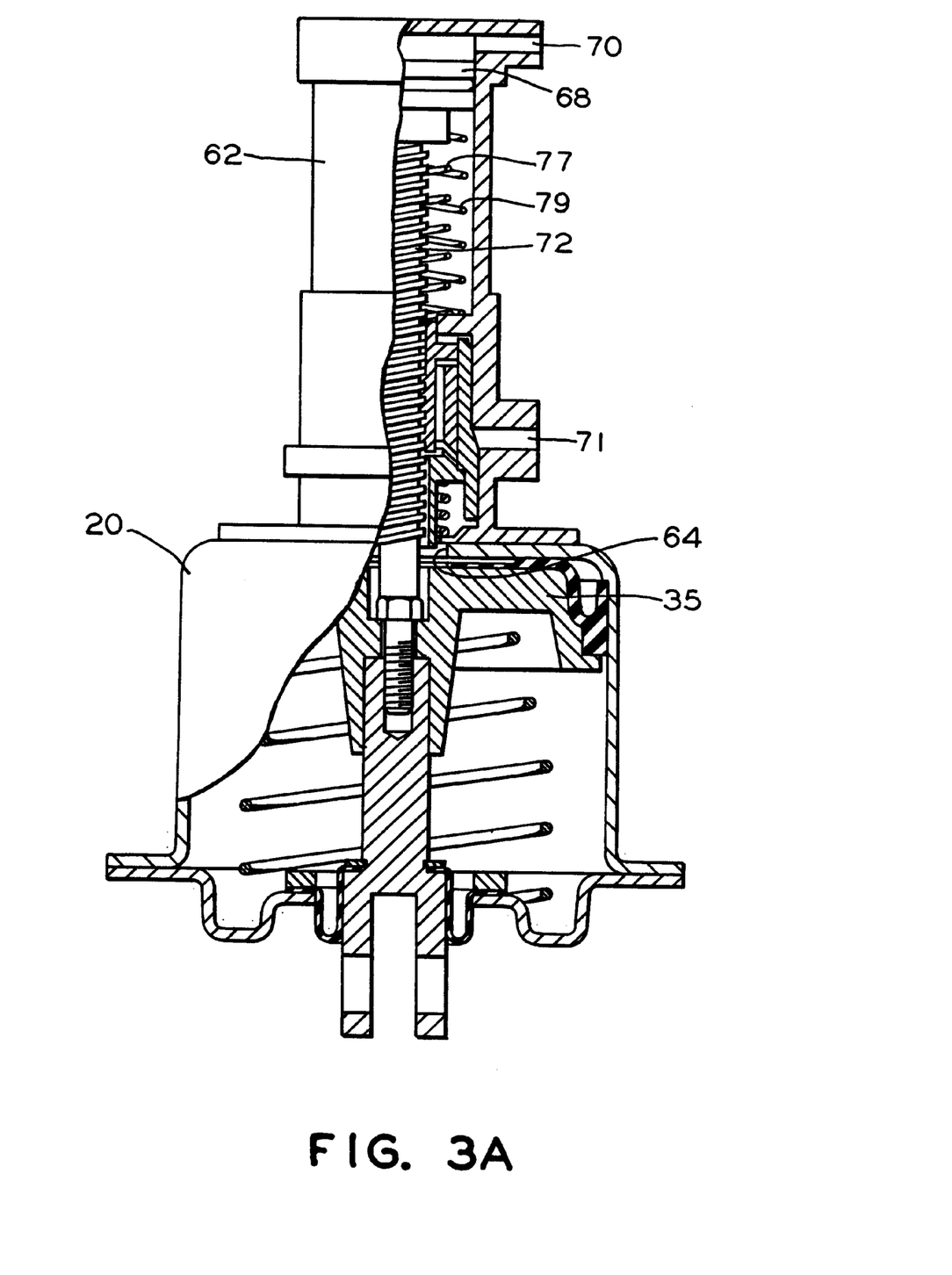
FIG. 3A is a cross-sectional view of the air cylinder and the hydraulic actuator of the hydraulic parking brake of the present invention wherein the hydraulic parking brake is in a released position.
Figure 3B:
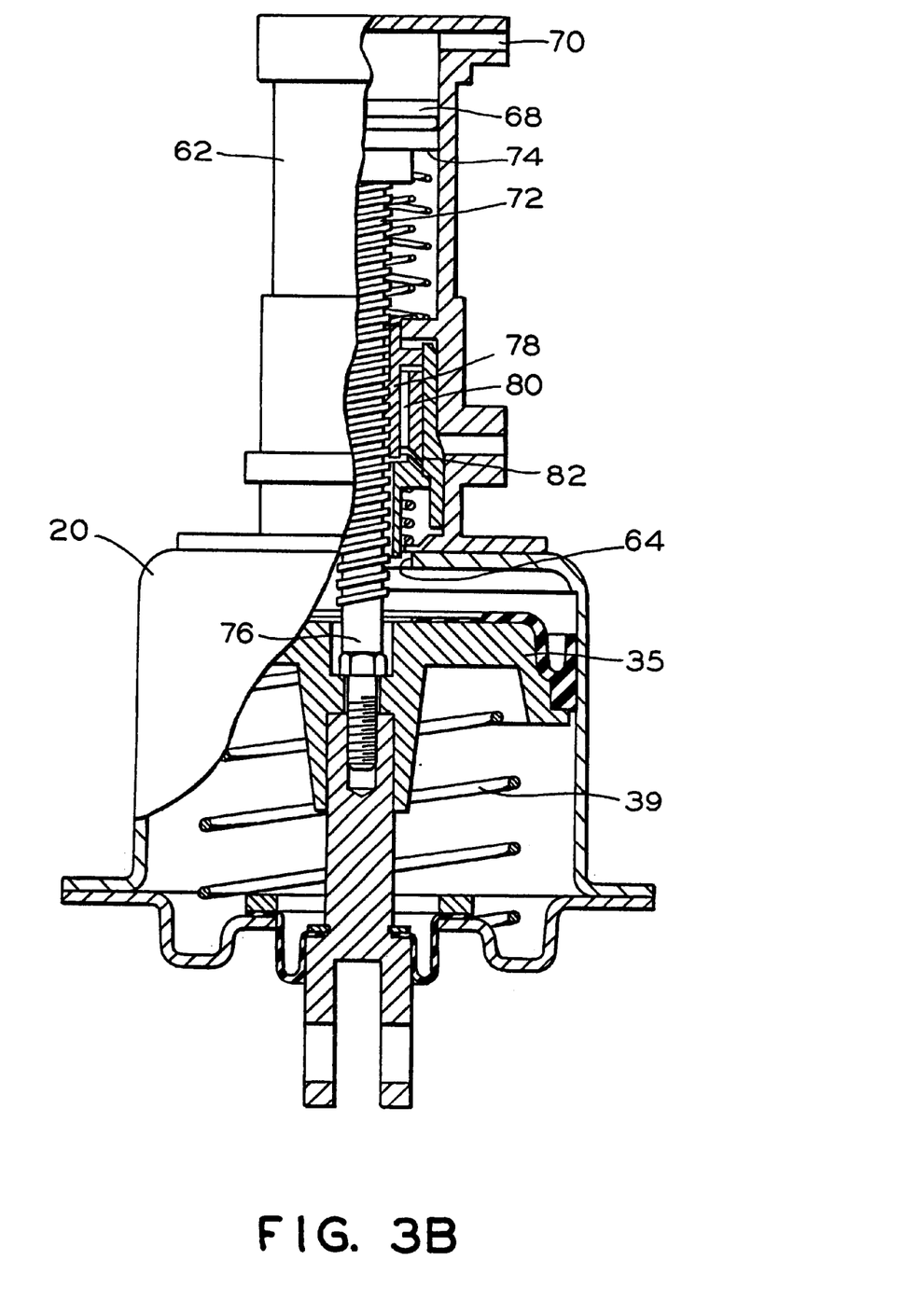
FIG. 3B is a cross-sectional view of the air cylinder and the hydraulic actuator of the hydraulic parking brake of the present invention wherein the hydraulic parking brake is in an applied position.
Figure 3C:
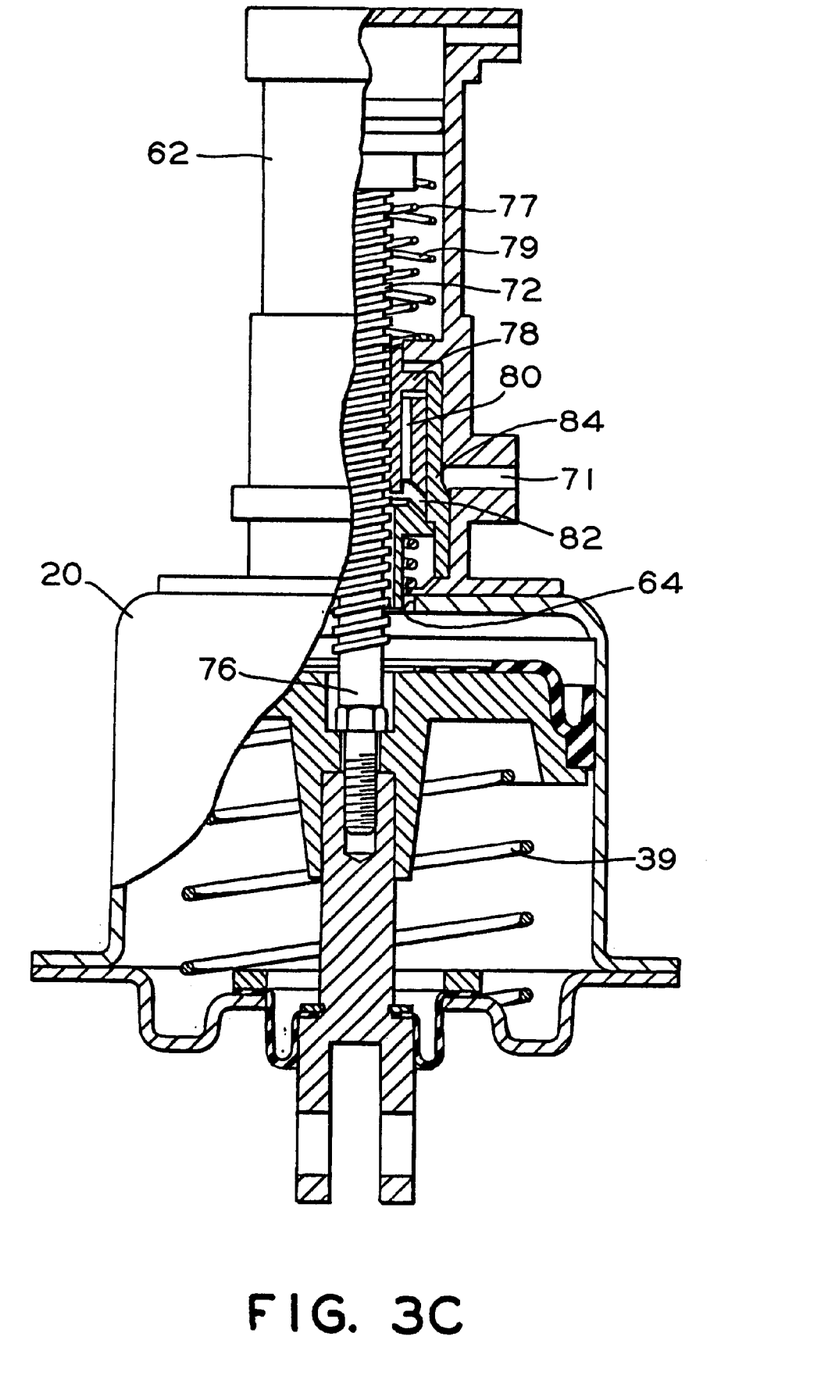
FIG. 3C is a cross-sectional view of the air cylinder and the hydraulic actuator of the hydraulic parking brake of the present invention wherein a hydraulic fluid is being applied to the hydraulic park g rake to return the hydraulic parking brake to a released position.

FIGS. 3A–3C illustrate cross-sectional views of the air cylinder 20 and the hydraulic actuator 62 of the hydraulic parking brake of the invention. Mounted within the hydraulic actuator 62 is a hydraulic piston member 68. This hydraulic piston member 68 is capable of movement in a forwardly or rearwardly direction upon application of hydraulic pressure thereto. This hydraulic pressure can be in the form of water, oil, and the like, which is applied to the hydraulic piston member 68 through openings 70 (for forward movement) and 71 (for rearward movement).

A spindle 72 having a first end 74 and a second end 76 is provided. This first end 74 of the spindle 72 is attached to the hydraulic piston member 68 so that the spindle 72 moves in accordance with movement of the hydraulic piston member 68. The second end 76 of the spindle 72 enters into the air cylinder 20 via aperture 64, which is provided in the rear surface of the air cylinder 20 and contacts the brake cylinder piston 35.

As shown in FIG. 3A, the hydraulic piston member 68 and the spindle 72 are held in their initial positions by springs 77 and 79 and the hydraulic parking brake is in a released position. The hydraulic piston member 68 and spindle 72 remain in this initial position during service brake applications wherein the air brake cylinder 20 is pressurized to cause movement of the air cylinder piston 35 to initiate a braking sequence.

During an automatic parking brake application, as illustrated in FIG. 3B, hydraulic fluid, such as oil, enters through the opening 70 of the hydraulic actuator 62 and applies pressure to the hydraulic piston member 68. The hydraulic piston member 68 pushes the spindle 72 through a spindle nut 78. Preferably, the spindle nut 78 rotates on non-self-locking threads of the spindle 72 as a one-way clutch 80 freely rotates in this direction. The spindle 72 moves forward into the air brake cylinder 20 and applies a pushing force to the brake cylinder piston 35 similar to the force that would have been applied if the air brake cylinder 20 had been pneumatically pressurized.

This pushing force from the brake cylinder piston 35 will initiate a forward movement of the brake cylinder piston rod 37 which, in turn, will cause the return spring 39 to compress and result in the movement of the push rod 38 in a direction to effect a counterclockwise rotation of the force-transfer lever 14. The force-transfer lever 14 then, in turn, actuates the slack adjuster assembly 28 so as to effect a counterclockwise rotation of the force-transfer lever 16 and consequent actuation of the return push rod assembly 32 causing the brake shoes to come into engagement with the tread surface of the vehicle wheels.

After the parking brake has been applied, the oil pressure is reduced to zero and the reaction force from the brake cylinder piston 35 onto the spindle 72 is taken up by the one-way clutch 80 which is locked in this direction. A toothed clutch 82 is engaged and prevents the spindle nut 78 from rotating.

A release of the parking brake, as illustrated in FIG. 3C, is caused by the application of a hydraulic fluid, such as oil, through opening 71 to apply pressure to a release piston 84. This application of hydraulic fluid pressure to the release piston 84 causes this piston 84 to be moved forward and toothed clutch 82 is disengaged. The spindle nut 78 and one-way clutch 80 are thereby free to rotate on spindle 72. Springs 77 and 79 expand and the piston 68 with the spindle 72 is moved back to its initial position. The parking brake is now fully released.

While the present invention has been described above with respect to truck-mounted braking systems, specifically TMX® truck mounted braking systems, the hydraulic parking brake assembly of the present invention can be used in other types of braking systems wherein the actuation of the hydraulic parking brake of the invention would result in the actuation of a series of levers and/or linkages to cause the application of a plurality of brake shoes.

Figure 4:
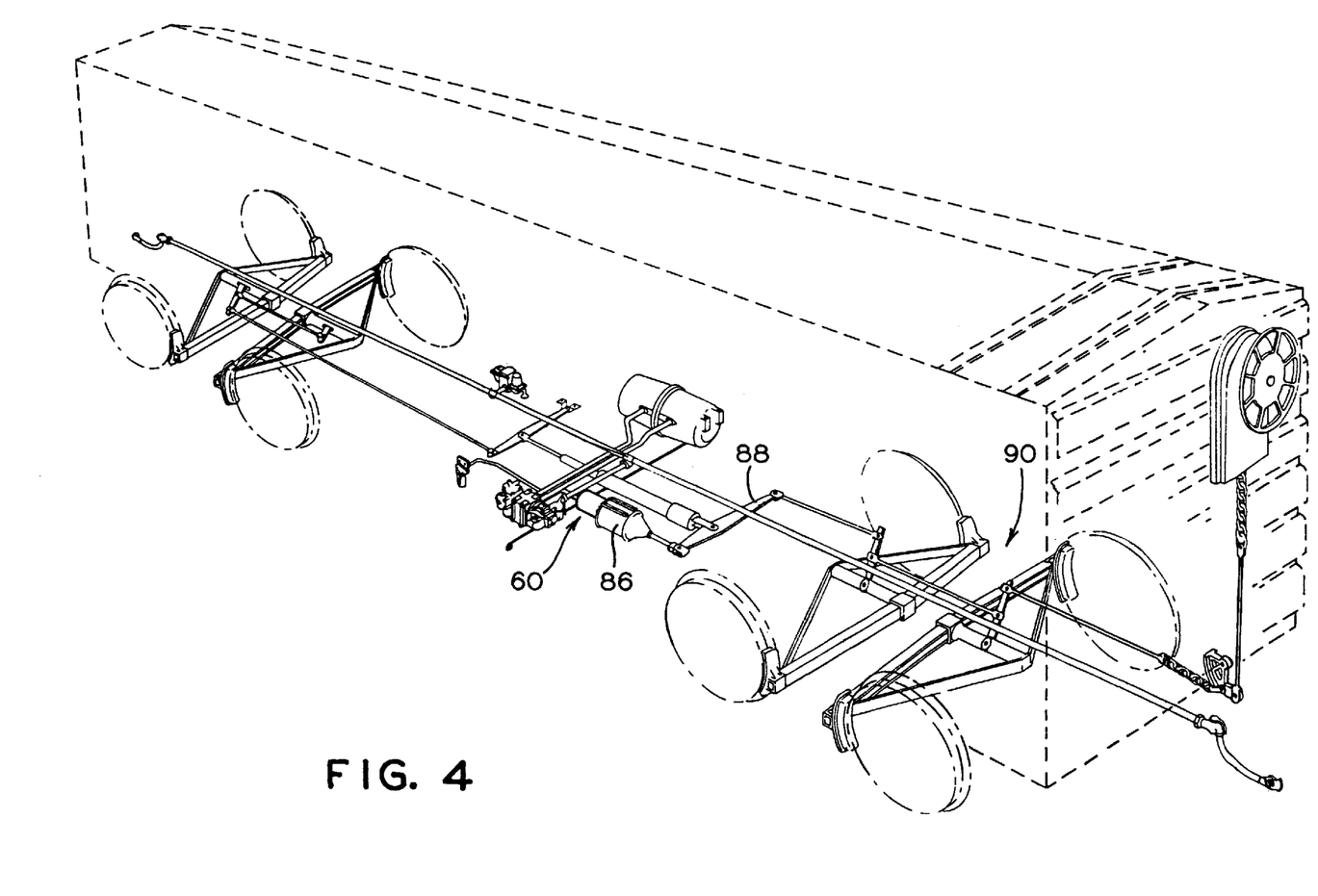
FIG. 4 is a plan view of a typical foundation brake arrangement including the hydraulic parking brake of the present invention.

FIG. 4 shows a typical foundation type brake arrangement with the hydraulic parking brake assembly 60 engageable with a pneumatic cylinder 86. In this embodiment of the invention, actuation of the spindle within the hydraulic actuator will cause the spindle to enter an aperture in the pneumatic cylinder and apply a force to the rod to move forward. This forward movement applies a force to a brake linkage series 90 to initiate a braking sequence.

Figure 5:
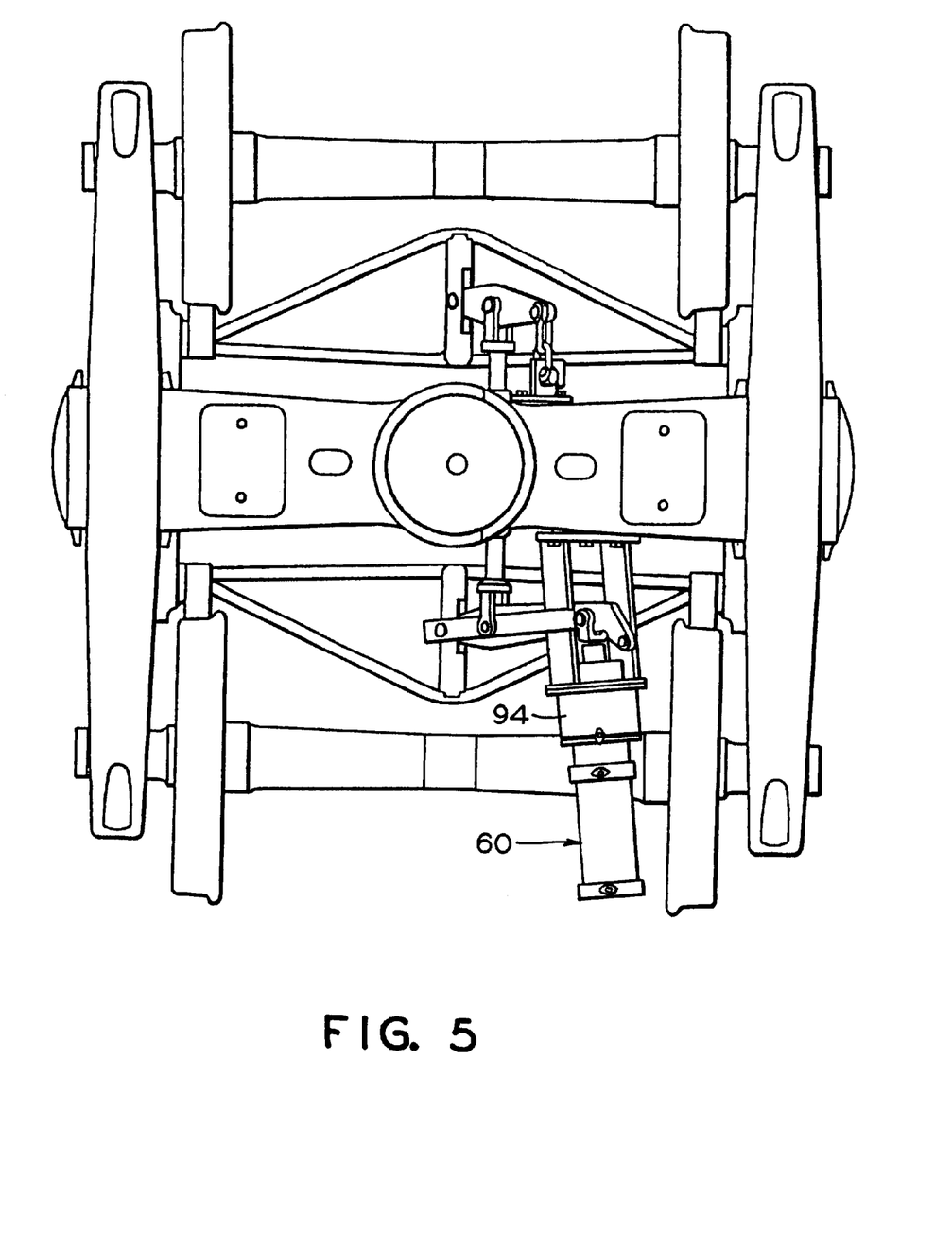
FIG. 5 is a plan view of an alternative truck-mounted type brake arrangement including the hydraulic parking brake of the present invention.

FIG. 5 shows a different type of braking system which includes a pneumatic cylinder 94 of which the hydraulic parking brake assembly may be associated in order to cause an actuation of the braking system in the absence of pneumatic pressure.

Thus, the present invention has been described in such full, clear, concise and exact terms as to enable any person skilled in the art to which it pertains to make and use the same. It will be understood that variations, modifications, equivalents, and substitutions for components of the specifically described embodiments of the invention may be made by those skilled in the art without departing from the spirit and scope of the invention as set forth in the appended claims.

I claim:

1. A hydraulic parking brake assembly for a railroad vehicle braking system, said hydraulic parking brake assembly comprising a hydraulic actuator mounted on such braking system, said hydraulic actuator being mounted in axial alignment with an air cylinder of such railroad vehicle braking system, said hydraulic actuator being associated with a piston within said air cylinder, said piston within said air cylinder being capable of movement in accordance with activation of said hydraulic actuator to initiate a braking sequence to cause movement of at least two brake shoes to achieve application of a parking brake to such railroad vehicle.

2. A hydraulic parking brake assembly for a railroad vehicle braking system, such railroad vehicle braking system including an air cylinder, an air cylinder piston and an air cylinder transfer lever, said hydraulic parking brake assembly comprising:

(a) a hydraulic actuator engaged with such railroad vehicle braking system;

(b) a hydraulic piston member positioned within said hydraulic actuator, said hydraulic piston member being capable of movement in a forwardly direction upon application of hydraulic pressure thereto; and (c) a spindle having a first end and a second end,
  (i) said first end being connected with said hydraulic piston member such that said spindle moves in accordance with movement of said hydraulic piston member, and
  (ii) said second end of said spindle being capable of entering an aperture within such air cylinder and applying a force to such air cylinder piston to cause movement of such air cylinder piston to initiate a braking sequence to achieve application of the parking brake to such railroad vehicle.

3. A hydraulic parking brake assembly, as recited in claim 2, wherein said aperture is disposed in a rear surface of such air cylinder.

4. A hydraulic parking brake assembly, as recited in claim 2, wherein said hydraulic parking brake assembly further includes at least one spring in said hydraulic actuator for holding said hydraulic piston member and said spindle in an initial position such that said hydraulic parking brake is in a released position.

5. A hydraulic parking brake assembly, as recited in claim 2, wherein said hydraulic actuator includes at least one opening in a first location to allow hydraulic fluid to enter said hydraulic actuator to achieve movement of said hydraulic piston member in a forwardly direction.

6. A hydraulic parking brake assembly, as recited in claim 5, wherein said assembly further includes a spindle nut and a one-way clutch, wherein upon application of hydraulic pressure through said at least one opening at said first location to achieve forward movement of said hydraulic piston member causes said spindle to move through said spindle nut and said one-way clutch.

7. A hydraulic parking brake assembly, as recited in claim 6, wherein said assembly further includes a toothed clutch for preventing said spindle nut from rotating after said forward movement of said hydraulic piston member.

8. A hydraulic parking brake assembly, as recited in claim 6, wherein said one-way clutch is capable of absorbing a reaction force from such air cylinder piston upon removal of oil pressure from within said hydraulic actuator.

9. A hydraulic parking brake assembly, as recited in claim 2, wherein said hydraulic actuator includes at least one opening in a second location to allow hydraulic fluid to enter said hydraulic actuator to achieve movement of said hydraulic piston member and said spindle in a rearwardly direction.

10. A hydraulic parking brake assembly, as recited in claim 9, wherein said hydraulic actuator includes a release piston, a toothed clutch, a spindle nut, a one-way clutch and at least one spring, wherein upon the application of hydraulic fluid through said opening at said second location causes said release piston to move in a forward direction causing said toothed clutch to become disengaged, allowing said spindle nut and said one-way clutch to freely rotate on said spindle and said at least one spring to expand to cause movement of said hydraulic piston and said spindle in a rearwardly direction to release said hydraulic parking brake assembly.

11. A hydraulic parking brake assembly, as recited in claim 2, wherein said hydraulic actuator is capable of being retrofitted within existing apertures formed through a truck bolster.

12. A hydraulic parking brake assembly for a truck mounted vehicle braking system, such truck mounted vehicle braking system including an air cylinder, an air cylinder push rod, an air cylinder transfer lever, a return push rod and a slack adjuster assembly, said hydraulic parking brake assembly comprising:

(a) a hydraulic actuator engaged with such return push rod of such truck mounted vehicle braking system;

(b) a hydraulic piston member positioned within said hydraulic actuator, said hydraulic piston member being capable of movement in a forwardly direction upon application of hydraulic pressure to said hydraulic piston member; and (c) a spindle having a first end and a second end,
  (i) said first end of said spindle being connected with said hydraulic piston member such that said spindle moves in accordance with movement of said hydraulic piston member, and
  (ii) said second end of said spindle being capable of entering an aperture within such air cylinder and applying a force to such air cylinder piston of such truck mounted vehicle braking system causing forward movement of such air cylinder piston, such forward movement of such air cylinder piston causing such air cylinder transfer lever to rotate and apply a force to such air cylinder push rod and such slack adjuster assembly of such truck mounted vehicle braking system to achieve activation of said parking brake assembly.

13. A hydraulic parking brake assembly, as recited in claim 12, wherein said aperture is disposed in a rear surface of such air cylinder.

14. A hydraulic parking brake assembly, as recited in claim 12, wherein said assembly further includes at least one spring in said hydraulic actuator for holding said hydraulic piston member and said spindle in an initial position such that said hydraulic parking brake is in a released position.

15. A hydraulic parking brake assembly, as recited in claim 12, wherein said hydraulic actuator includes at least one opening in a first location to allow hydraulic fluid to enter said hydraulic actuator to achieve movement of said hydraulic piston member in a forwardly direction.

16. A hydraulic parking brake assembly, as recited in claim 15, wherein said assembly further includes a spindle nut and a one-way clutch, wherein upon application of hydraulic pressure through said at least one opening at said first location to achieve forward movement of said hydraulic piston member causes said spindle to move through said spindle nut and said one-way clutch.

17. A hydraulic parking brake assembly, as recited in claim 16, wherein said assembly further includes a toothed clutch for preventing said spindle nut from rotating after said forward movement of said hydraulic piston member.

18. A hydraulic parking brake assembly, as recited in claim 16, wherein said one-way clutch is capable of absorbing a reaction force from such air cylinder piston upon removal of oil pressure from within said hydraulic actuator.

19. A hydraulic parking brake assembly, as recited in claim 12, wherein said hydraulic actuator includes at least one opening in a second location to allow hydraulic fluid to enter said hydraulic actuator to achieve movement of said hydraulic piston member and said spindle in a rearwardly direction.

20. A hydraulic parking brake assembly, as recited in claim 19, wherein said hydraulic actuator includes a release piston, a toothed clutch, a spindle nut, a one-way clutch and at least one spring, wherein upon the application of hydraulic fluid through said opening at said second location causes said release piston to move in a forward direction causing said toothed clutch to become disengaged, allowing said spindle nut and said one-way clutch to freely rotate on said spindle and said at least one spring to expand to cause movement of said hydraulic piston and said spindle in a rearwardly direction to release said hydraulic parking brake assembly.

21. A hydraulic parking brake assembly, as recited in claim 12, wherein said hydraulic actuator is capable of being retrofitted within existing apertures formed through a truck bolster.

22. A hydraulic parking brake assembly, as recited in claim 21, wherein a diameter of said hydraulic actuator is one of approximately up to three inches and less than or equal to a diameter of such slack adjuster.

23. A hydraulic actuated parking brake assembly for a railroad vehicle braking system comprising:
   (a) an air cylinder engaged with such railroad vehicle braking system, said air cylinder having an aperture disposed through a surface thereof;
   (b) a piston located within said air cylinder, one end of said piston being connected with an air cylinder transfer lever and an oppositely disposed end located adjacent said aperture within said air cylinder;
   (c) a hydraulic actuator mounted on such railroad vehicle braking system;
   (d) a hydraulic piston member positioned within said hydraulic actuator, said hydraulic piston member being capable of movement in a forwardly direction upon application of hydraulic pressure thereto; and
   (e) a spindle having a first end and a second end,
      (i) said first end being connected with said hydraulic piston member such that said spindle moves in accordance with movement of said hydraulic piston member, and
      (ii) said second end of said spindle entering through said aperture within said air cylinder and applying a force to said oppositely disposed end of said air cylinder piston to cause movement of said air cylinder piston to initiate a braking sequence to achieve application of the parking brake to such railroad vehicle.

* * * * *